(12) United States Patent
Porter et al.

(10) Patent No.: US 11,268,423 B1
(45) Date of Patent: Mar. 8, 2022

(54) TWO-PART TWO-STAGE MIXER

(71) Applicant: Tenneco Automotive Operating Company Inc., Lake Forest, IL (US)

(72) Inventors: Jason Roy Porter, Spring Arbor, MI (US); Ronald Rohraff, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 17/016,850

(22) Filed: Sep. 10, 2020

(51) Int. Cl.
*F01N 3/00* (2006.01)
*F01N 3/28* (2006.01)

(52) U.S. Cl.
CPC ........ *F01N 3/2892* (2013.01); *F01N 2240/20* (2013.01)

(58) Field of Classification Search
CPC .. B01F 3/04049; B01F 5/0609; F01N 3/2892; F01N 2240/20
See application file for complete search history.

(56) References Cited

U.S. PATENT DOCUMENTS

| | | | | |
|---|---|---|---|---|
| 7,908,845 | B2* | 3/2011 | Brown | B01F 5/0616 60/286 |
| 9,217,353 | B2* | 12/2015 | Naga | B01F 5/0268 |
| 9,440,204 | B2* | 9/2016 | Palmer | B01F 5/0606 |
| 10,352,220 | B2 | 7/2019 | Nagata | |
| 10,443,477 | B2 | 10/2019 | Sampath et al. | |
| 2009/0262599 | A1* | 10/2009 | Kohrs | B01F 3/04049 366/337 |
| 2010/0107617 | A1* | 5/2010 | Kaiser | B01F 3/04049 60/324 |
| 2010/0218490 | A1* | 9/2010 | Forster | B01F 5/0616 60/324 |
| 2010/0293931 | A1* | 11/2010 | Peters | B01D 53/9431 60/324 |
| 2011/0036082 | A1 | 2/2011 | Collinot | |
| 2011/0146254 | A1* | 6/2011 | Yi | B01F 5/0616 60/310 |
| 2011/0258983 | A1* | 10/2011 | Vosz | B01F 5/0616 60/274 |
| 2015/0040547 | A1* | 2/2015 | Brockman | B01F 5/0617 60/324 |
| 2018/0078912 | A1 | 3/2018 | Yadav et al. | |

FOREIGN PATENT DOCUMENTS

| | | |
|---|---|---|
| DE | 102016115030 A1 | 2/2018 |
| KR | 101175114 B1 | 8/2012 |

* cited by examiner

*Primary Examiner* — Matthew T Largi
(74) *Attorney, Agent, or Firm* — Harness, Dickey & Pierce, P.L.C.

(57) ABSTRACT

A mixer comprises a first subassembly including a first holder fixed to a first mixing element. The first holder includes a base interconnecting a first sidewall with a spaced apart second sidewall. The first mixing element includes a base interconnecting first and second spaced apart mounting flanges that are fixed to the first and second sidewalls. A second subassembly includes a second holder fixed to a second mixing element. The second holder includes a base interconnecting a third sidewall with a spaced apart fourth sidewall. The second mixing element including a base interconnecting third and fourth spaced apart mounting flanges that are fixed to the third and fourth sidewalls. Distal ends of the first sidewall and the third sidewall are fixed to one another. Distal ends of the second sidewall and the fourth sidewall are fixed to one another.

21 Claims, 9 Drawing Sheets

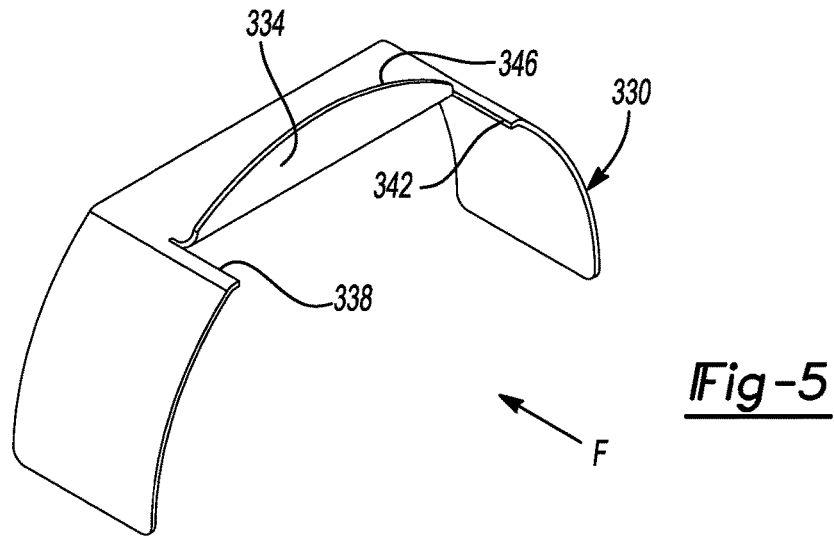
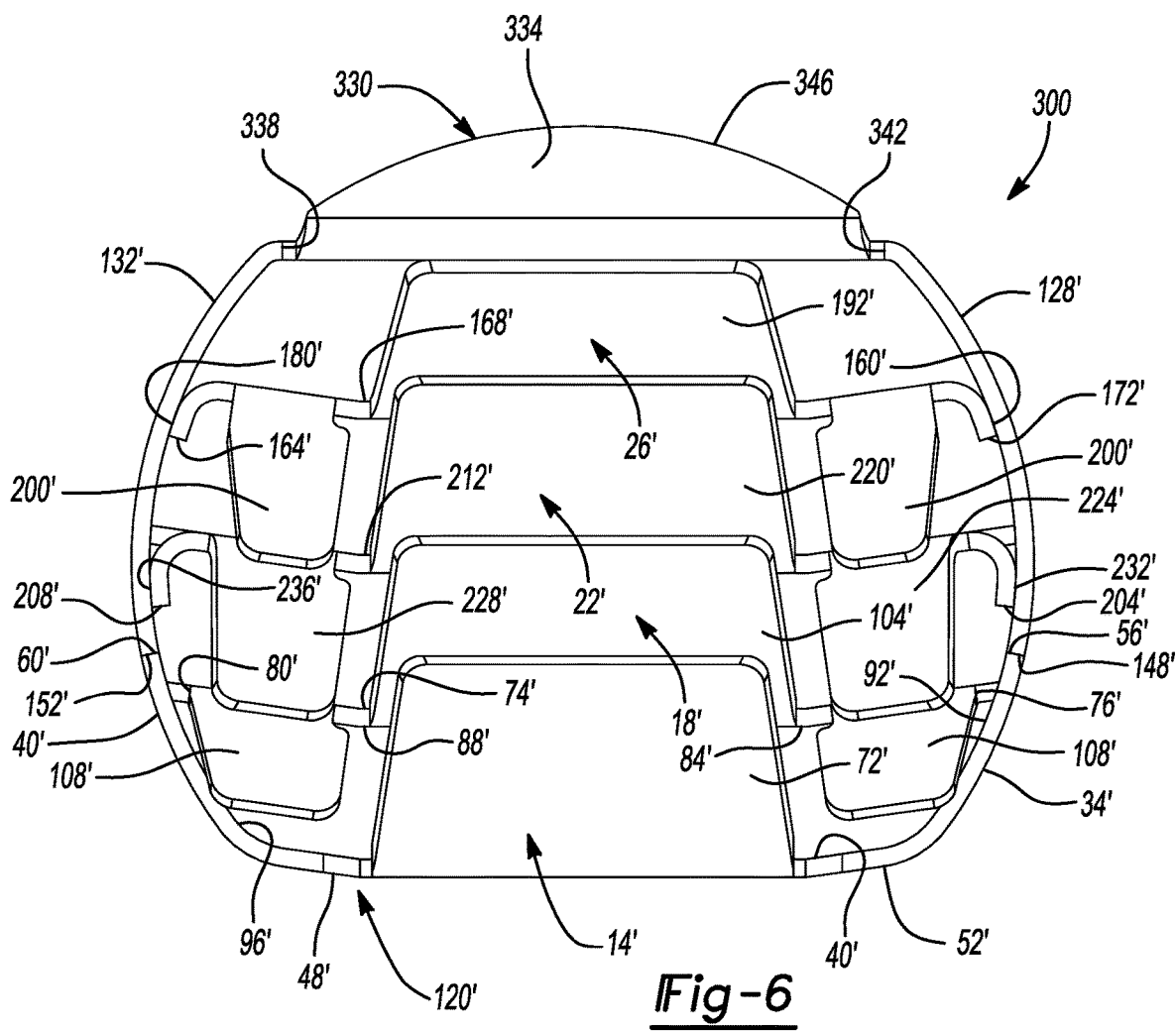

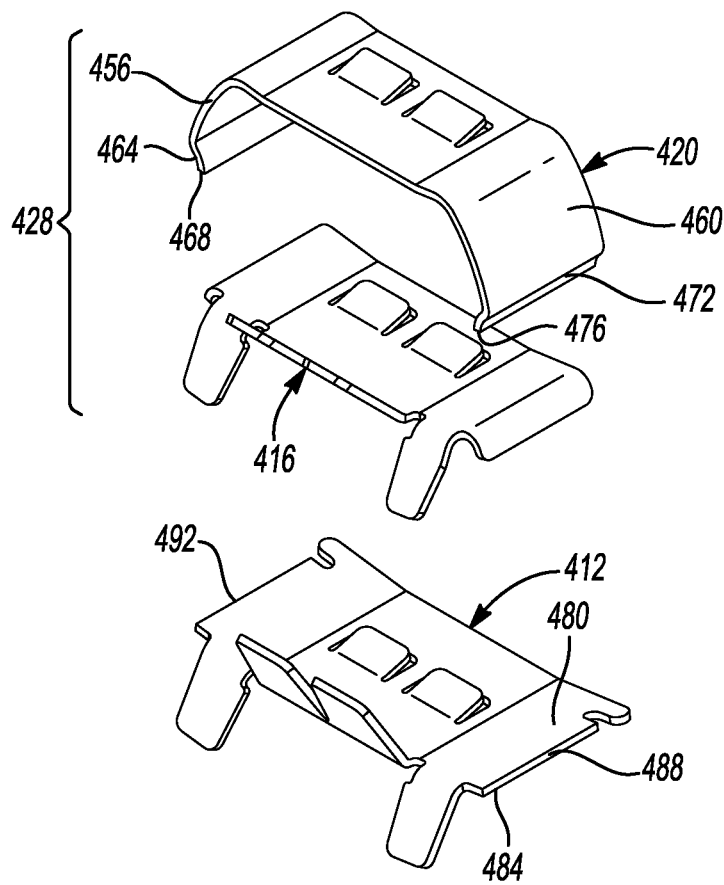
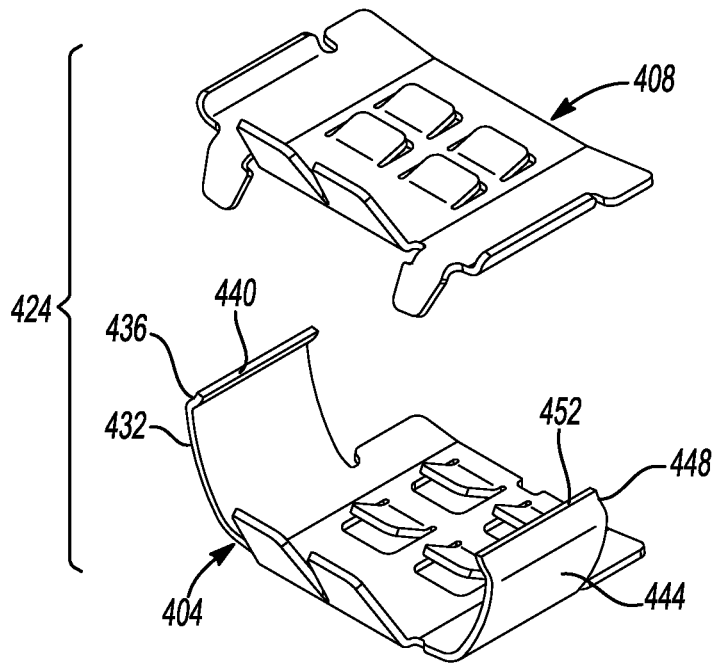
Fig-8

TWO-PART TWO-STAGE MIXER

FIELD

The disclosure pertains to an exhaust gas mixer.

BACKGROUND

Internal combustion engines emit exhaust gases including constituents that may be undesirable for emission to the atmosphere. Several known exhaust gas treatment systems include an injection device for injecting a reductant into an exhaust conduit. The reductant is mixed with the exhaust gas for subsequent treatment using a process such as selective catalytic reduction.

U.S. Pat. No. 9,440,204 describes several different mixer embodiments configured to be positioned within an exhaust conduit of an exhaust gas treatment system. While the previously described mixers have functioned well, an opportunity exists to reduce the manufacturing costs associated with constructing the mixers.

SUMMARY

A mixer for mixing an exhaust flow in an exhaust pipe comprises a first subassembly including a first holder fixed to a first mixing element. The first holder includes a base interconnecting a first sidewall with a spaced apart second sidewall. The base includes a deflection element extending upstream of the first and second sidewalls and substantially parallel to a direction of the exhaust flow. The first mixing element including a base interconnecting first and second spaced apart mounting flanges. The first and second mounting flanges are fixed to the first and second sidewalls. A second subassembly includes a second holder fixed to a second mixing element. The second holder includes a base interconnecting a third sidewall with a spaced apart fourth sidewall. The second mixing element including a base interconnecting third and fourth spaced apart mounting flanges, the third and fourth mounting flanges being fixed to the third and fourth sidewalls. A distal end of the first sidewall of the first holder is fixed to a distal end of the third sidewall of the second holder, a distal end of the second sidewall of the first holder is fixed to a distal end of the fourth sidewall of the second holder.

In another arrangement, the present disclosure describes a mixer for mixing an exhaust flow in an exhaust pipe comprising a subassembly including a first mixing element fixed to a second mixing element. The first mixing element has a first sidewall and a spaced apart second sidewall, each including a distal end spaced apart from one another. Portions of the first and second sidewalls are adapted to be fixed to the exhaust pipe. The first mixing element includes a deflection element extending upstream of the first and second sidewalls. The second mixing element interconnects the first and second sidewalls and extends substantially parallel to the first mixing element. The second mixing element includes a mixing fin to change a direction of the exhaust flow. A third mixing element has first and second spaced apart lateral flanges. A fourth mixing element includes a third sidewall and a spaced apart fourth sidewall. The third and fourth sidewalls each include a distal end spaced apart from one another. The third mixing element is sandwiched between the subassembly and the fourth mixing element such that the distal ends of the first and second sidewalls engage a first surface of the third mixing element and the distal ends of the third and fourth sidewalls engage a second opposite surface of the third mixing element. An external surface of the first mixing element, an external surface of the fourth mixing element and the lateral flanges are interconnected by a weld.

DRAWINGS

The drawings described herein are for illustrative purposes only of selected embodiments and not all possible implementations, and are not intended to limit the scope of the present disclosure.

FIG. 5 is a perspective view of a portion of an alternate embodiment mixer;

FIG. 6 is a front view of the alternate embodiment mixer including the component depicted in FIG. 5;

FIG. 8 is an exploded perspective view of the mixer depicted in FIG. 7;

DETAILED DESCRIPTION

Figure 1:
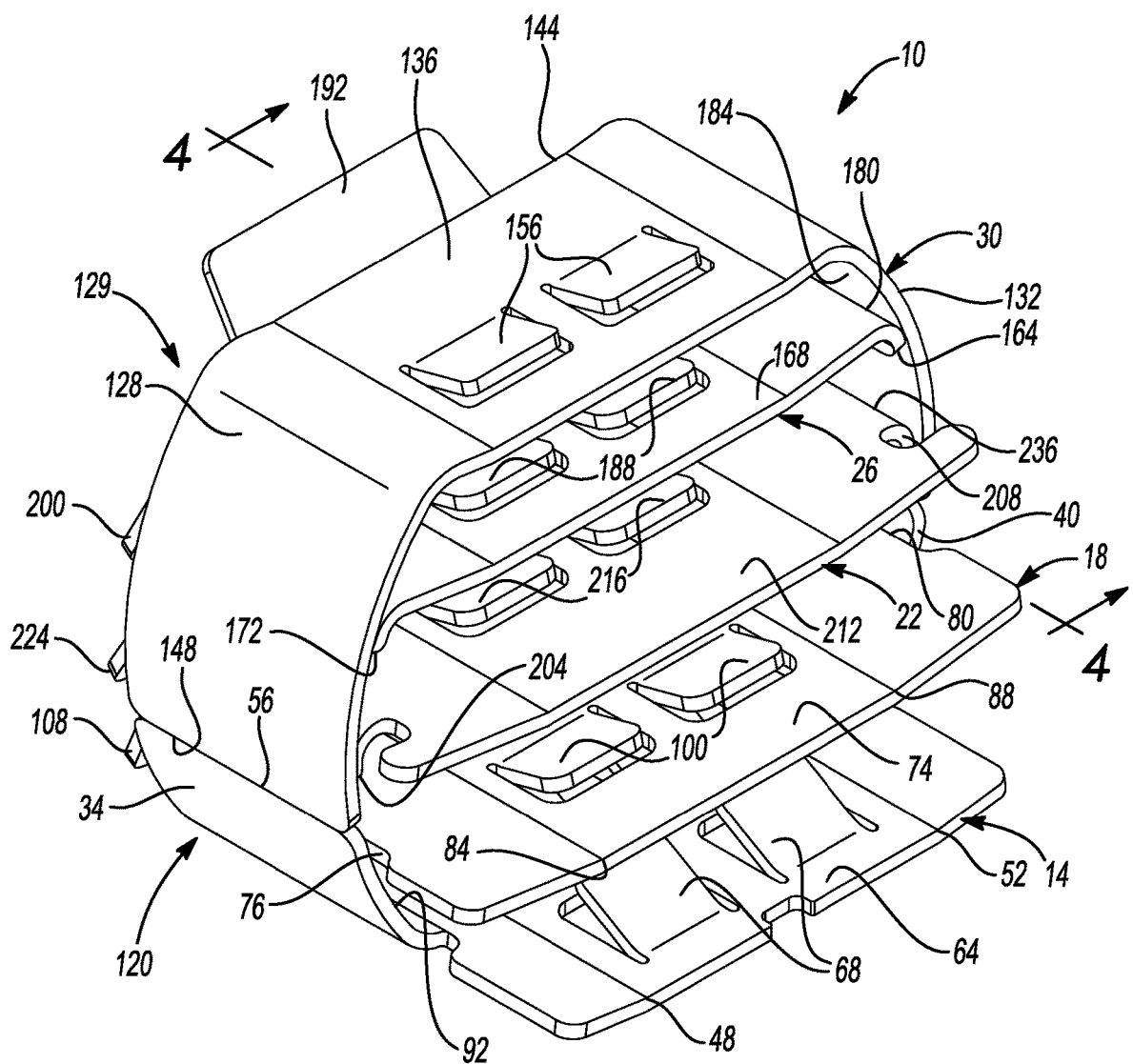
FIG. 1 is perspective view of a mixer for mixing an exhaust flow in an exhaust pipe.
Figure 2:
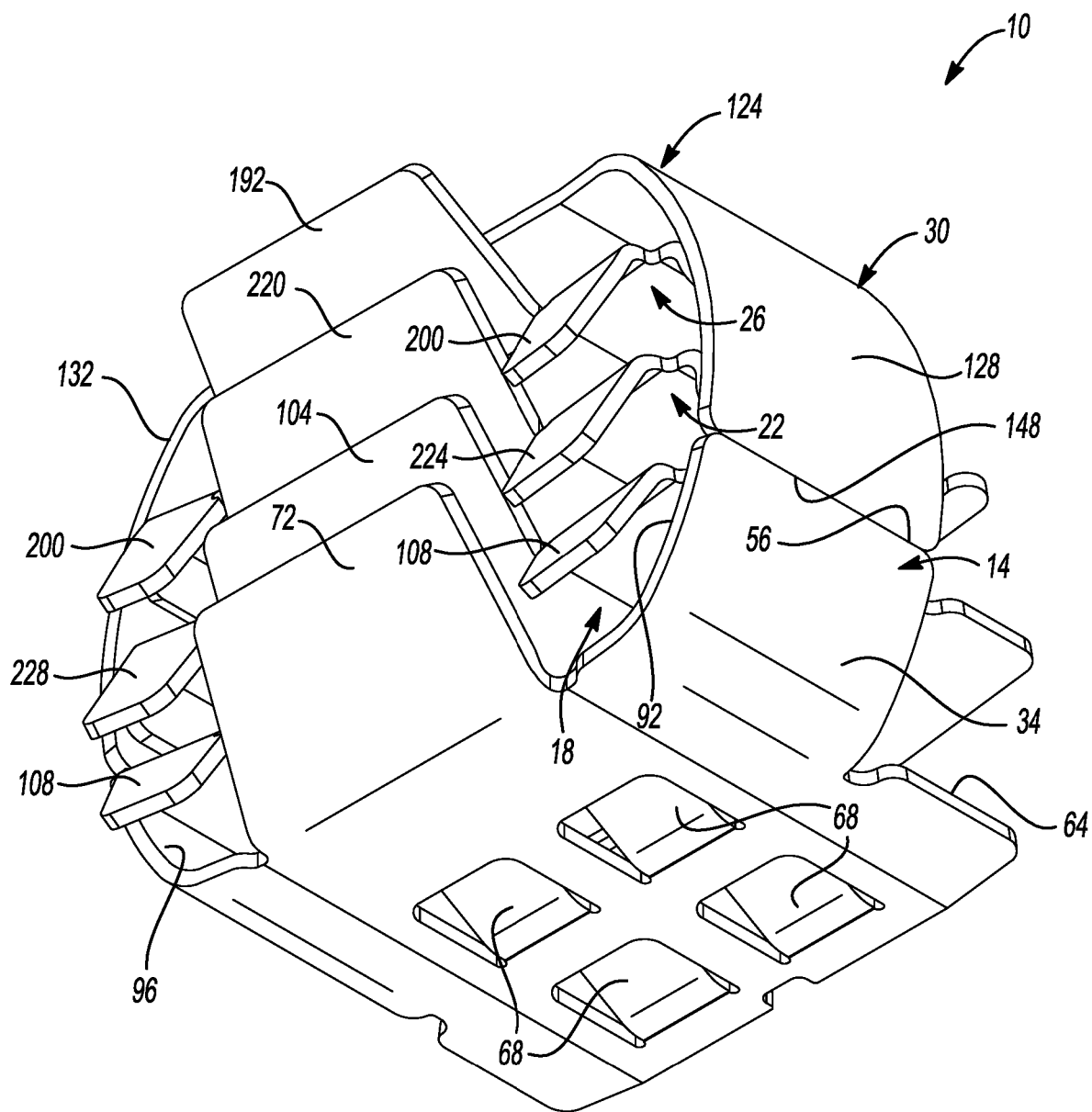
FIG. 2 is another perspective view of the mixer depicted in FIG. 1.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-4 depict a mixer identified at reference numeral 10. Mixer 10 includes a first mixing element 14, a second mixing element 18, a third mixing element 22, a fourth mixing element 26, and a fifth mixing element 30. Each of the mixing elements 14, 18, 22, 26, 30 are fixed to one another to configure mixer 10 as a one-piece assembly. First mixing element 14 functions as a first holder or housing as well as a mixing element. Fifth mixing element 30, similarly functions as a holder or housing as well as a mixing element.

First mixing element 14 incudes a first arcuately shaped sidewall 34 spaced apart from a second arcuately shaped sidewall 40. A substantially planar base 44 interconnects first sidewall 34 with second sidewall 40 to define a "U" shape. Base 44 may include minor bends or may be curved to provide bending inflection points 48, 52, as shown in the Figures. First sidewall 34 includes a distal end 56 spaced apart from a distal end 60 of second sidewall 40.

An integrally formed deflection element 64 axially extends from base 44 substantially parallel to a direction of exhaust flow F passing through the exhaust conduit. Deflection element 64 includes a plurality of correction fins 68 which are raised with reference to the direction of flow, F, at an angle A of approximately 30 degrees. A mixing fin 72 extends at an angle B of approximately 60 degrees in relation to the direction of flow F.

Second mixing element 18 includes a base 74 having a first edge 76 spaced apart and extending substantially parallel to a second edge 80. Base 74 extends substantially parallel to and offset from base 44. Bending inflection points 84, 88 are provided along base 74 to account for thermal expansion during mixer operation. First edge 76 is positioned in engagement with inner surface 92 of first sidewall 34. Second mixing element 18 is fixed to first sidewall 34 along first edge 76 using a process such as welding. Other techniques including riveting, adhesive bonding, or mechanical fastening maybe employed. Similarly second edge 80 is positioned in engagement with an inner surface 96 of second sidewall 40. Second mixing element 18 is fixed to second sidewall 40 using a process as previously described.

Second mixing element includes one or more correction fins 100 extending at an angle C of approximately 15 degrees relative to the direction of flow F. A mixing fin 104 is centrally positioned along base 74 and extends substantially parallel to mixing fin 72. Outer mixing fins 108 are positioned on opposite sides of mixing fin 104 and extend in an opposite direction from mixing fin 104 at an angle D of approximately 60 degrees with reference to the direction of flow F.

The combination of first mixing element 14 and second mixing element 18 defines a first or lower subassembly 120. As will be described in further detail, third, fourth and fifth mixing elements 22, 26, 30 are fixed to one another to define an upper or second subassembly 124.

Fifth mixing element 30 incudes a first arcuately shaped sidewall 128 spaced apart from a second arcuately shaped sidewall 132. A substantially planar top 136 interconnects first sidewall 128 with second sidewall 132 to define an inverted "U" shape. Top 136 may be curved or may include minor bends to provide bending inflection points 140, 144. First sidewall 128 includes a distal end 148 spaced apart from a distal end 152 of second sidewall 132. Mixer 10 is positioned within an exhaust conduit such that top 136 is downstream from a reductant injection device. Top 136 extends substantially parallel to the direction of flow F of exhaust through the exhaust conduit. A plurality of correction fins 156 are raised with reference to the direction of flow. As such, correction fins 156 extend parallel to correction fins 100.

Fourth mixing element 26 includes a first flange 160 spaced apart from a second flange 164. A base 168 interconnects first flange 160 and second flange 164. Base 168 extends substantially parallel to and offset from top 136. First flange 160 includes an outer surface 172 positioned in engagement with an inner surface 176 of first sidewall 128. First flange 160 is fixed to first sidewall 128 via a process such as welding. In similar fashion, second flange 164 includes an outer surface 180 positioned in engagement with an inner surface 184 of second sidewall 132. Second flange 164 is fixed to second sidewall 132 using a welding process or another fastening procedure.

Fourth mixing element 26 also includes one or more correction fins 188 extending parallel to correction fins 156. Fourth mixing element includes a centralized mixing fin 192 extending at an angle E of 45° with reference to the direction of flow F. It should be appreciated that angle E need not be equal to angle B and that often times it is beneficial to have mixing fin 192 extend in a non-parallel manner to mixing fins 72 and 104. Outboard mixing fins 196, 200 are positioned on opposite sides of mixing fin 192 and extend in a parallel manner to mixing fins 108.

Third mixing element 22 is substantially similar to fourth mixing element 26. Third mixing element 22 includes first and second flanges 204, 208. A base 212 interconnects first flange 204 with second flange 208. Base 212 is positioned to extend substantially parallel to top 136 as well as the direction of flow F. First flange 204 and second flange 208 are shaped and positioned to be fixed to inner surfaces 176, 184 of fifth mixing element 30. Third mixing element 22 includes laterally spaced apart mixing fins 216, a mixing fin 220 and outward mixing fins 224, 228. The fins of third mixing element 22 extend substantially parallel to the corresponding fins of second mixing element 18.

Figure 3:
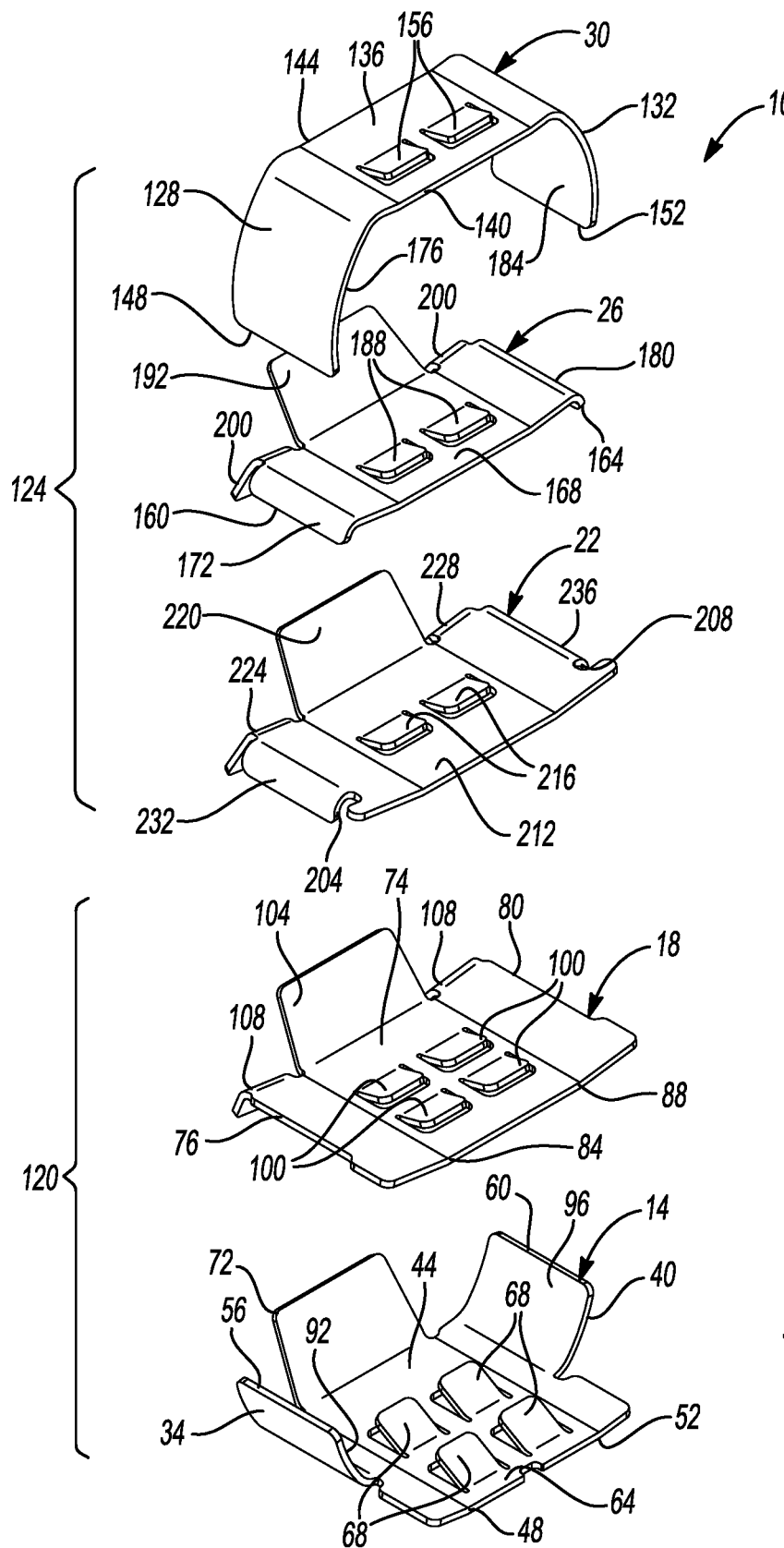
FIG. 3 is an exploded perspective view of the mixer according to the present disclosure.
Figure 4:
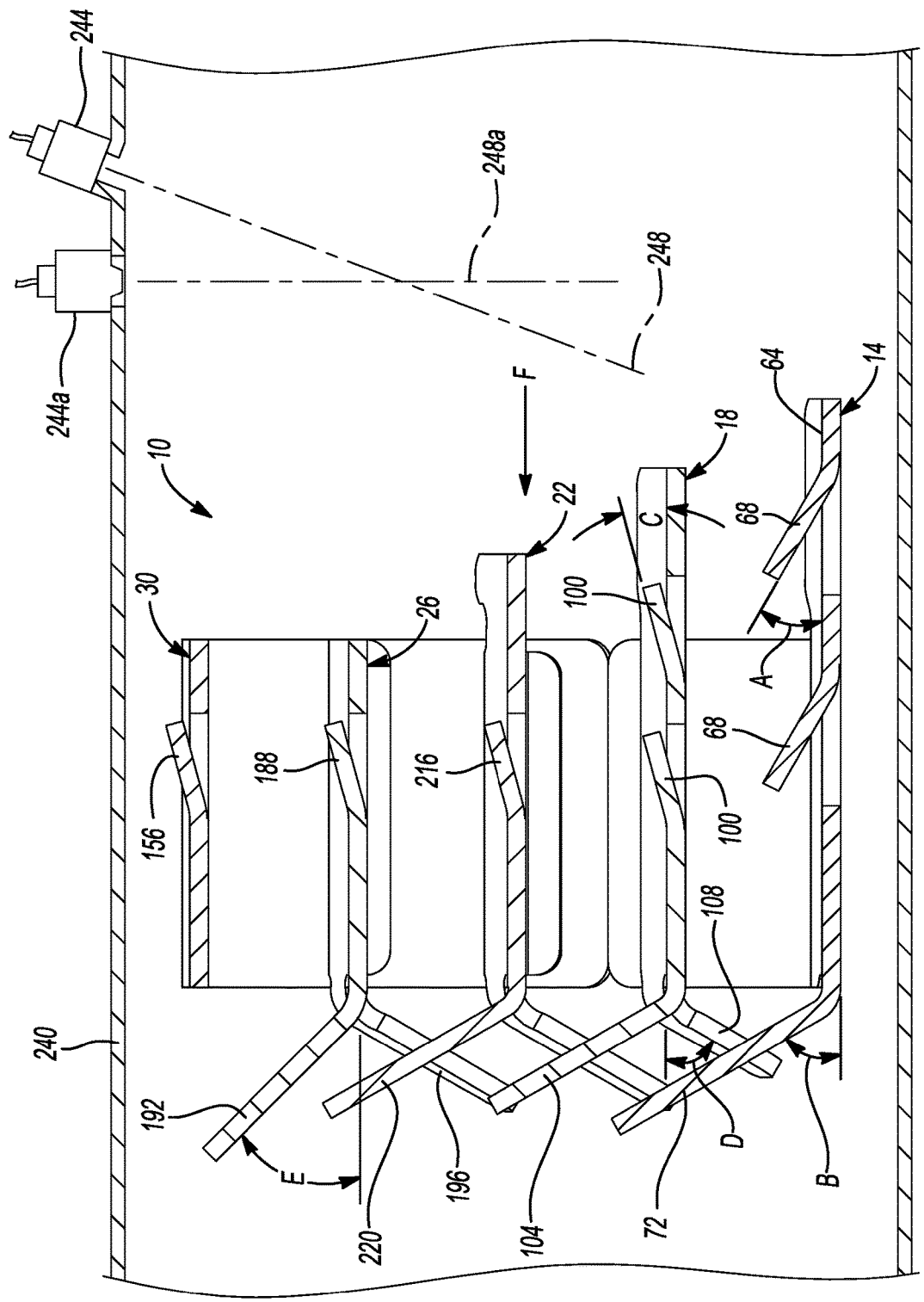
FIG. 4 is a cross-sectional view of the mixer taken along line 4-4 as shown in FIG. 1.

To achieve a reduced cost of manufacture, each of the mixing elements 14, 18, 22, 26, 30 are individually stamped from metal sheets and formed as depicted in FIG. 3. As previously mentioned, second mixing element 18 is fixed to first mixing element 14 to define lower subassembly 120. Upper subassembly 124 is created by first welding or otherwise fixing fourth mixing element 26 to fifth mixing element 30. The interface between first flange 160 and first sidewall 128 as well as the interface between second flange 164 and second sidewall 132 are easily accessible by a tip of a welder such that a weld bead may be applied on inner surfaces 176, 184.

Subsequently, third mixing element 22 is positioned such that an outer surface 232 of first flange 204 engages inner surface 176 of fifth mixing element 30. At the same time, and outer surface 236 of second flange 208 is positioned in engagement with inner surface 184 second sidewall 132. Once again, relatively easy access is provided for a tip of a welding gun to apply a weld bead to both first flange 204 and inner surface 176 as well as second flange 208 and inner surface 184.

Once each of lower subassembly 120 and upper subassembly 124 are completed, the subassemblies are joined to one another by welding distal end 148 of first sidewall 128 to distal end 56 of first sidewall 34. Similarly, distal end 152 of second side wall 132 is fixed via welding to distal end 60 of second sidewall 40.

Once mixer 10 is completed, the mixer may be positioned within an exhaust conduit 240. First sidewalls 34, 128 and second sidewalls 40, 132 are sized and shaped to contact or to be in close proximity to an inner surface of the exhaust conduit. Mixer 10 may be placed within the exhaust conduit at a desired axial position and angular orientation relative to a reductant injector 244 and subsequently fixed thereto by any number of processes including welding, mechanical fastening, clamping or the like. It is contemplated that mixer 10 is positioned such that reductant injected into the exhaust conduit impacts deflection element 64. In one configuration, an axis 248 along which reductant is injected reductant directly intersects a portion of deflection element 64. Alternatively, the injector, depicted at reference numeral 244a, may be oriented such that an injection axis 248a does not directly intersect deflection element 64 but droplets of injected reductant are redirected or otherwise guided by flowing exhaust gas to impact deflection element 64.

FIGS. 5 and 6 relate to an alternate embodiment mixer 300. Mixer 300 is substantially similar to mixer 10 with the exception of the fifth mixing element. Like element will retain their previously introduced reference numerals including a prime suffix and will not be described in detail again. Mixer 300 includes a fifth mixing element 330 in lieu of fifth mixing element 30. Fifth mixing element 330 includes an upturned flap 334. Flap 334 is formed by slitting top 136' along edges 338 and 342 and subsequently bending the separated top portion approximately ninety degrees to define flap 334. Flap 334 includes a curved upper edge 346 that is shaped to conform to the shape of an inner surface of the exhaust conduit in which mixer 300 is to be positioned. In this manner, the amount of exhaust gas allowed to bypass mixer 300 is minimized.

Figure 7:
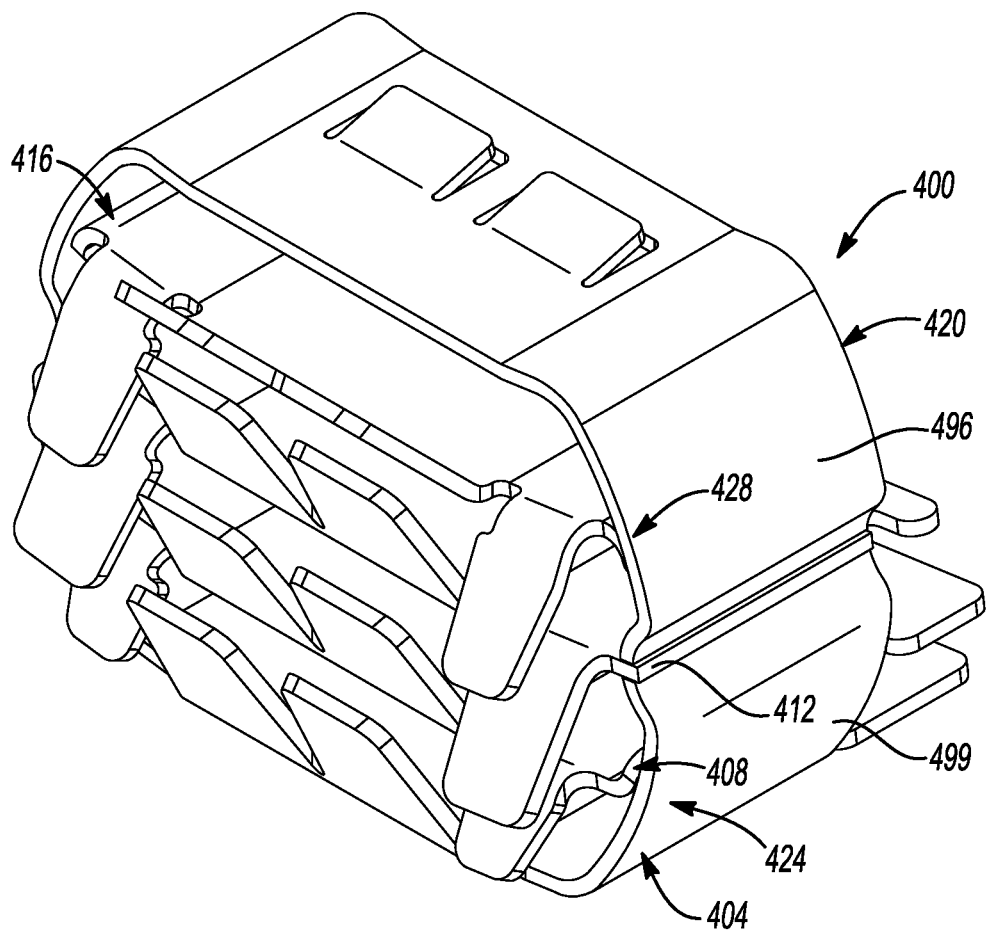
FIG. 7 is a perspective view of another alternate embodiment mixer.

FIGS. 7 and 8 depict another alternate embodiment mixer 400. Mixer 400 is substantially similar to mixer 10 and includes a first mixing element 404, second, third, and fourth transversely extending and spaced apart mixing elements 408, 412, 416, as well as a fifth mixing element 420. First mixing element 404 functions as a lower housing and a mixing plate. Fifth mixing element 420 functions as an upper housing and a mixing plate.

A first or lower subassembly 424 is constructed by fixing second mixing element 408 to first mixing element 404. A second or upper subassembly 428 is manufactured by fixing fourth mixing element 416 to fifth mixing element 420. First mixing element 404 includes a first sidewall 432 having an inwardly curved distal portion 436 terminating at an end face 440. First mixing element 404 includes a second sidewall 444 spaced apart from first sidewall 432. Second sidewall 444 includes an inwardly curved distal end portion 448 terminating at an end face 452. Fifth mixing element 420 is similarly configured with first and second sidewalls 456, 460. First sidewall 456 includes an inwardly curved portion 464 terminating at an end face 468. Second sidewall 460 includes an inwardly curved portion 472 terminating at an end face 476.

To complete manufacture of mixer 400, third mixing element 412 is positioned between lower subassembly 424 and upper subassembly 428. More particularly, an upper surface 480 of third mixing element 412 is placed in engagement with end faces 468, 476 of fifth mixing element 420. An opposite lower surface 484 of third mixing element 412 is placed in engagement with end surfaces 440, 452 of first mixing element 404. Because each of the first and fifth mixing elements 404, 420 include radially inwardly curved portions 436, 448, 464, 472, lateral flanges 488, 492 may extend radially outwardly beyond an outer surface 496 of fifth mixing element 420 and outer surface 499 of first mixing element 404. Lower subassembly 424, third mixing element 412 and upper subassembly 428 are fixed to one another by welding the components to one another. A weld bead may be applied to outer surfaces 496, 499 as well as flanges 488, 492 of third mixing element 412. The size and shape of the curved portions of first mixing element 404 and fifth mixing element 420 are defined to assure that the weld bead applied to interconnect the components will not interfere with an inner surface of the conduit in which mixer 400 is to be placed.

Figure 9:
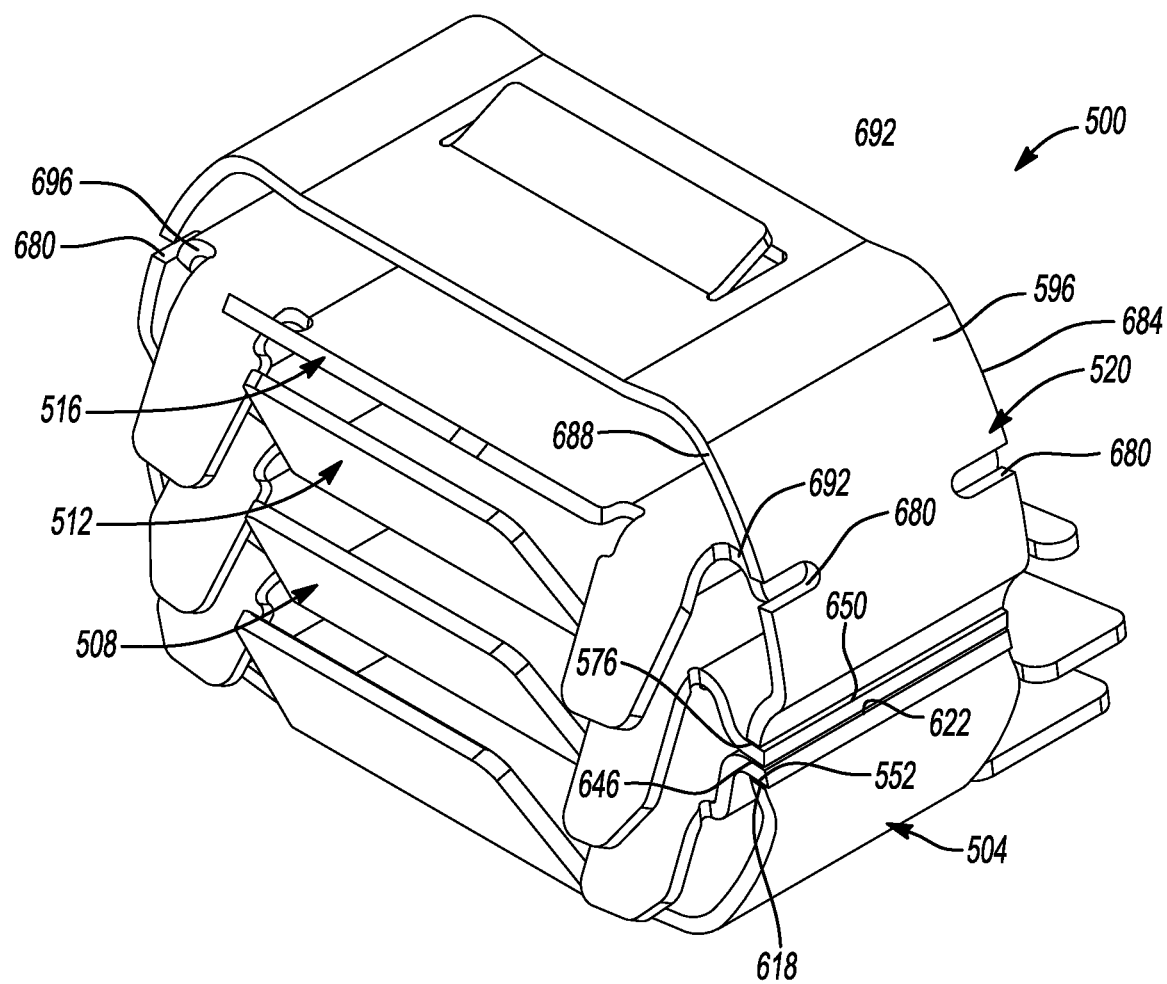
FIG. 9 is a perspective view of another alternate embodiment mixer.
Figure 10:
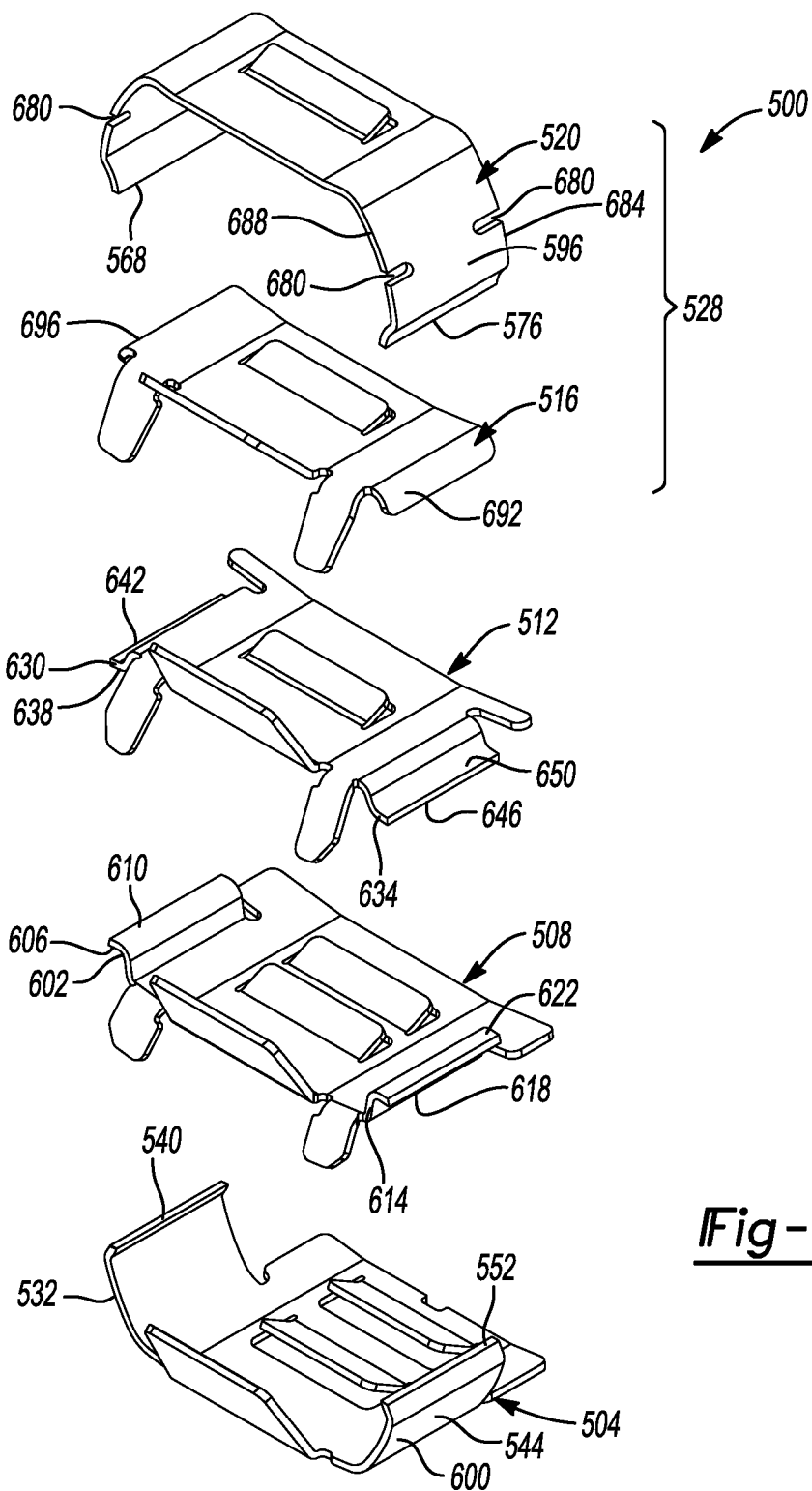
FIG. 10 is an exploded perspective view of the mixer depicted in FIG. 9.

FIGS. 9 and 10 depict another alternate embodiment mixer identified at reference numeral 500. Mixer 500 is substantially similar to mixer 400. Like elements will retain their previously introduced reference numerals increased by 100. In particular, first mixing element 504 is substantially similar to first mixing element 404 and includes an end face 540 positioned at the distal end of first sidewall 532. An end face 552 is positioned at the distal end of second sidewall 544. Fifth mixing element 520 includes end faces 568 and 576. As depicted in the figures, the number of fins and the relative position of correction fins and mixing fins may be tailored to the particular exhaust treatment system in which the mixers are positioned.

An upper subassembly 528 is defined by welding fourth mixing element 516 to fifth mixing element 520. FIGS. 9 and 10 depict fifth mixing element 520 to include optional weld access slots 680. Each of the slots 680 extends through the thickness of fifth mixing element 520 for a predefined distance from either a leading edge 684 or a trailing edge 688 of fifth mixing element 520. Each of the slots 680 is positioned to allow access for the tip of a weld gun to one of first flange 692 or second flange 696 of forth mixing element 516. During the welding process, a weld bead or puddle is formed within each slot 680 to fix fourth mixing element 516 to fifth mixing element 520. It should be appreciated that similar weld access slots may be provided in any of the previously described embodiments, if desired.

A lower subassembly is not constructed during the manufacturer of mixer 500. On the contrary, second mixing element 508 is placed in engagement with end faces 540, 552 of first mixing element 504. More particularly, second mixing element 508 includes a first flange 602 having a lower surface 606 and an opposite parallel upper surface 610. On the opposite lateral extent of second mixing element 508, a second flange 614 includes a lower surface 618 and an opposite parallel upper surface 622. Lower surfaces 606, 618 are positioned in engagement with end faces 540, 552 of first mixing element 504.

Third mixing element 512 includes radially outwardly extending first and second flanges 630, 634. First flange 630 includes a bottom surface 638 and an opposite upper surface 642. Second flange 634 includes a bottom surface 646 and an opposing parallel upper surface 650. To create a one-piece mixer 500, bottom surface 638 and bottom surface 646 are placed in direct contacting engagement with upper surfaces 610, 622 of second mixing element 508. Upper subassembly 528 is placed in a position such that end faces 568, 576 of fifth mixing element 520 are in direct contacting engagement with upper surfaces 642, 650 of third mixing element 512. At this point in time, one or more weld beads are applied to an external surface 596 of fifth mixing element 520, an external surface 600 of first mixing element 504 as well as portions of flanges 602, 614, 630, and 634. The size and shape of the sidewalls of first mixing element 504 and fifth mixing element 520 as well as the geometrical configuration of the flanges of second mixing element 508, and third mixing element 520, as well as the geometrical configuration of the flanges of second mixing element and third mixing element 512 are such that the weld beads would not interfere with an inner surface of the conduit in which mixer 500 is inserted.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A mixer for mixing an exhaust flow in an exhaust pipe, the mixer comprising:
a first subassembly including a first mixing element fixed to a second mixing element, the first mixing element including a base interconnecting a first sidewall with a spaced apart second sidewall, the base extending substantially parallel to a direction of the exhaust flow, the second mixing element being fixed to the first and second sidewalls; and
a second subassembly including a third mixing element directly fixed to a fourth mixing element, the third mixing element including a base interconnecting a third sidewall with a spaced apart fourth sidewall, the fourth mixing element being fixed to the third and fourth sidewalls, wherein a distal end of the first sidewall of the first mixing element is fixed to a distal end of the third sidewall of the third mixing element, a distal end of the second sidewall of the first mixing element being fixed to a distal end of the fourth sidewall of the third mixing element, wherein the second mixing element and the fourth mixing element are spaced apart from one another.

2. The mixer of claim 1, wherein the base of the third mixing element extends substantially parallel to the base of the first mixing element.

3. The mixer of claim 1, wherein the second mixing element includes a mixing fin extending away from a base of the second mixing element to change a direction of the exhaust flow, wherein the mixing fin extends downstream from first and second mounting flanges.

4. The mixer of claim 1, wherein the first and second sidewalls of the first mixing element extend an axial length, the base of the first mixing element including a deflection element overhanging the first and second sidewalls by being positioned outside of the axial length.

5. The mixer of claim 4, wherein a mixing fin is positioned outside of the axial length on an opposite side of the first and second sidewalls as the deflection element.

6. The mixer of claim 1, wherein the base of the first mixing element includes a deflection element including a substantially planar portion extending substantially parallel to a direction of the exhaust flow and a correction fin extending at an angle to the exhaust flow direction.

7. The mixer of claim 1, wherein one of the first mixing element and the third mixing element includes a weld access slot, the weld access slot being aligned with one of the second and fourth mixing elements.

8. The mixer of claim 1, wherein portions of the first and second sidewalls of the first mixing element and the third mixing element are sized and shaped to compliment an inner surface of the exhaust pipe.

9. The mixer of claim 1, wherein the fourth mixing element includes a mixing fin, the mixing fins of the second and fourth mixing elements extending substantially parallel to one another and extending at an angle ranging substantially from 45 degrees to 60 degrees relative to a direction of exhaust flow upstream of the mixer.

10. The mixer of claim 1, wherein the base of the first mixing element includes a deflection element including correction fins positioned axially upstream from the first and second sidewalls.

11. The mixer of claim 10, wherein the correction fins include upturned portions of a common one-piece plate from which the deflection element and first mixing element are formed, the correction fins including free edges and an attached portion.

12. The mixer of claim 11, wherein each of the free edges of the correction fins are positioned downstream from their respective attached portions.

13. The mixer of claim 1, wherein the third mixing element includes a flap integrally formed with and extending from the top in a direction away from the first mixing element, the flap being shaped to restrict exhaust flow from bypassing the mixer.

14. The mixer of claim 13, wherein a leading edge of the top of the third mixing element includes two parallel and spaced apart slits adjacent edges of the flap.

15. The mixer of claim 1, wherein the base of the first mixing element includes a deflection element positioned to be impacted by a fluid injected into the exhaust pipe.

16. A mixer for mixing an exhaust flow in an exhaust pipe, the mixer comprising:
   a first mixing element having a first sidewall and a spaced apart second sidewall, the first and second sidewalls each including a distal end spaced apart from one another, wherein portions of the first and second sidewalls are adapted to be fixed to the exhaust pipe,
   a second mixing element having first and second spaced apart lateral flanges; and
   a third mixing element including a third sidewall and a spaced apart fourth sidewall, the third and fourth sidewalls each including a distal end spaced apart from one another, wherein the second mixing element is sandwiched between the first mixing element and the third mixing element, the distal ends of the first and second sidewalls engaging a first surface of the second mixing element and the distal ends of the third and fourth sidewalls engaging a second opposite surface of the second mixing element, wherein an external surface of the first mixing element, an external surface of the third mixing element and the lateral flanges are interconnected by a weld.

17. The mixer of claim 16, wherein the first and second sidewalls extend an axial length, the first mixing element including a deflection element overhanging the first and second sidewalls by being positioned outside of the axial length.

18. The mixer of claim 17, wherein the deflection element is planar and extends upstream of the first and second sidewalls substantially parallel to a direction of the exhaust flow.

19. The mixer of claim 16, further including a fourth mixing element fixed to the third mixing element and interconnecting the third and fourth sidewalls.

20. The mixer of claim 16, wherein the third mixing element includes a top interconnecting the third and fourth sidewalls, the top including an integrally formed upturned flap extending away from the first mixing element.

21. A mixer for mixing an exhaust flow in an exhaust pipe, the mixer comprising:
   the first subassembly including a first mixing element fixed to a second mixing element, the first mixing element being monolithic and including a first side wall and a spaced apart second side wall,
   the second mixing element being fixed to the first side wall and the second sidewall; and
   a second subassembly including a third mixing element directly fixed to a fourth mixing element, the third mixing element being monolithic and including a third side wall and a spaced apart fourth sidewall, the fourth mixing element being fixed to the third sidewall and the fourth sidewall, wherein a distal end of the first side wall of the first mixing element is fixed to a distal end of the third sidewall of the third mixing element.

* * * * *